No. 633,068. Patented Sept. 12, 1899.
W. DU HENRI BROWN.
RAT TRAP.
(Application filed May 13, 1899.)
(No Model.)

Witnesses
Louis D. Heinrichs.
Chas. S. Hyer.

Inventor
William du Henri Brown
By Victor J. Evans
Attorney

United States Patent Office.

WILLIAM DU HENRI BROWN, OF SAVANNAH, GEORGIA.

RAT-TRAP.

SPECIFICATION forming part of Letters Patent No. 633,068, dated September 12, 1899.

Application filed May 13, 1899. Serial No. 716,665. (No model.)

*To all whom it may concern:*

Be it known that I, WILLIAM DU HENRI BROWN, a citizen of the United States, residing at Savannah, in the county of Chatham and State of Georgia, have invented certain new and useful Improvements in Rat-Traps; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to rat traps or destroyers adapted for use particularly in large buildings, warehouses, or analogous places.

The invention consists of the details of construction and arrangement of the several parts, which will be more fully hereinafter described and claimed; and the object of the invention is to dispense with the use of a plurality of small traps and to also overcome the disadvantages incident to such devices and having in lieu thereof a stationary trap always ready for use and effective in its operation.

Figure 1:
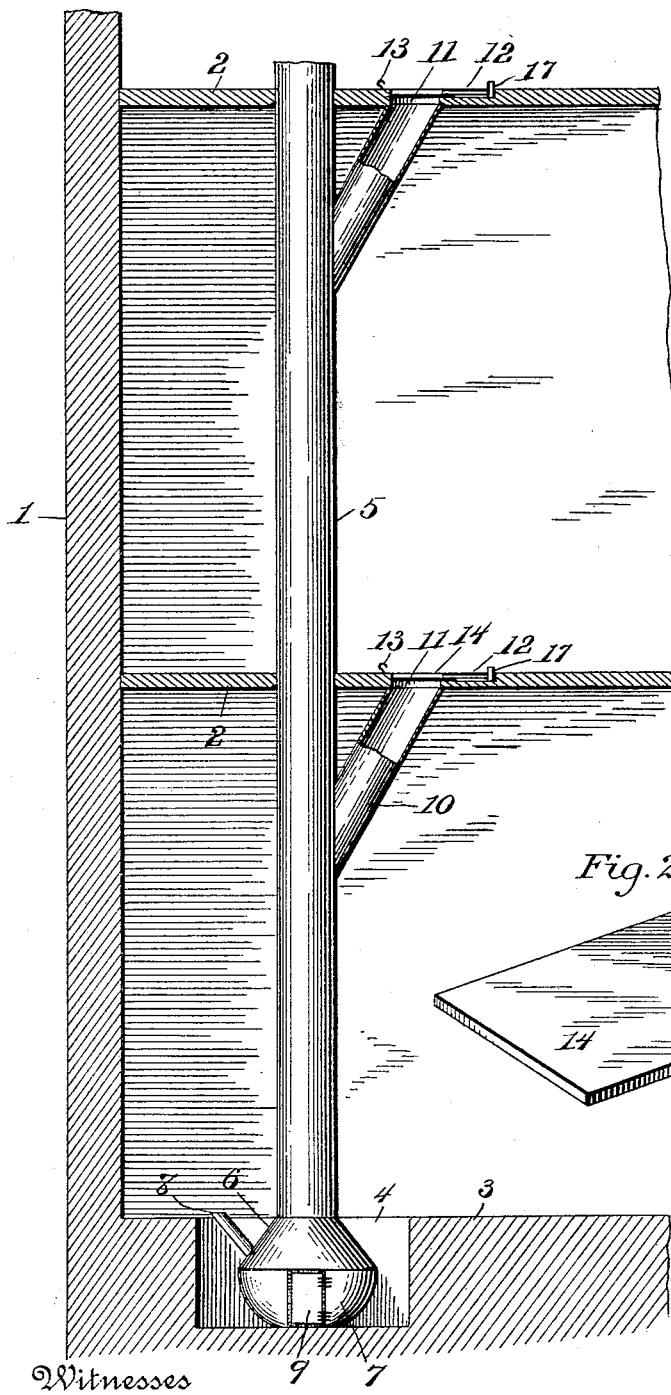
Figure 2:
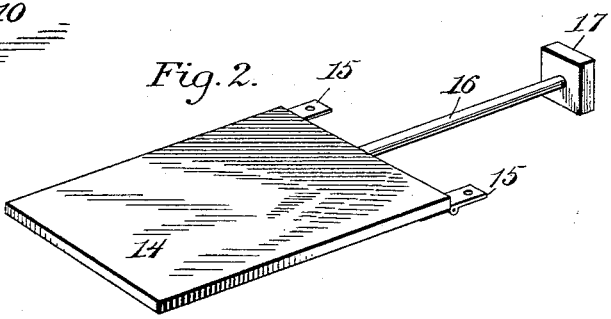

In the accompanying drawings, Figure 1 is a section of a portion of a building, showing the improved trap arranged in connection therewith and preferably broken away. Fig. 2 is a detail perspective view of one of the trap-doors or tilting platforms.

Like characters of reference are employed in the views to indicate corresponding parts.

Referring to the drawings, the numeral 1 designates a part of a building of any character, and 2 the floors thereof, representing stories, and 3 a basement-flooring having therein a sink 4. Within one of the walls or adjacent a wall, as may be desired, a vertical chute 5 is disposed and constructed of suitable material and of preferred diameter. This chute extends from the lower floor or basement of the building in which the device is placed upwardly through the several floors or stories to any distance desired, and at the bottom connects with the upper conical portion 6 of a lower reservoir or receptacle 7. The said reservoir or receptacle is placed in the sink 4, and to the upper conical portion 6 a supply-pipe 8 is attached, through which water or medicated material may be introduced into the said receptacle or reservoir. The lower part of the receptacle or reservoir has a door 9 movably attached thereto and will be supplied with suitable means for preventing leakage, such as rubber packings or gaskets, and the purpose of the said door is to relieve the reservoir or receptacle of the animals collected therein.

At regular points along the length of the conduit 5 branch pipes or conduits 10 are connected and project upwardly at an angle and coincide with openings 11 in the several floors. Adjacent the openings 11 the upper portions of the floors are formed with recesses 12 on one side, and at the opposite sides bait-hooks or analogous devices 13 are located. Over each opening 11 a tilting platform or trap-door 14 is pivotally attached by means of hinges 15, as shown by Fig. 2, though other means of connecting said trap-doors or platforms can be utilized. The said trap-doors or platforms are hinged or pivoted at the end farthest from the bait-hooks or analogous devices 13, and extending outward from their hinged ends are arms 16, having counterpoise-weights 17 on the free ends thereof, which normally rest in the recesses 12 of the floors.

The bait-hooks or analogous devices 13 are first supplied with some form of enticing bait, and the rats or other vermin approach the bait over the trap-doors or tilting platforms 14, and the weight of such animals when disposed on the free ends of such trap-doors or platforms will cause the latter to tilt downwardly and throw the animals into the conduit, and from thence to the chute 5 and down into the liquid-containing receptacle or reservoir 7. It is proposed to position the bait-hooks or analogous devices 13 in such manner that an obstruction will exist of a nature to prevent the animals from reaching the same from lateral directions, and in such instances to arrive at this desirable result it is preferred that the trap-doors or tilting platforms be disposed in corners of a room close to a wall, so that it will be impossible for the rats or other vermin to reach the bait without passing over said doors or platforms.

To accommodate various applications the proportions of the several parts may be varied and continued indefinitely through a building of considerable height.

The pipes or conduits 10 may be made any length and extend at different distances from the chute 5 and also be connected up at opposite diametrical points to said chute, which will be an evident change within the scope of the invention.

If desired, the liquid placed in the receptacle or reservoir 7 may be impregnated with some poisonous medicament or ordinary water be used.

Furthermore, the proportions and dimensions, as well as the minor details of construction, can be varied without in the least departing from the spirit of the invention or sacrificing any of the advantages thereof.

It will be understood also that after the several trap-doors or tilting platforms are relieved of the weight or pressure of the animals the counterpoise-weights 17 will cause such devices to resume their normal positions, and thereby automatically reset the several traps or platforms.

Having thus described the invention, what is claimed as new is—

1. In a device of the character set forth, the combination of a vertically-disposed chute having a liquid-containing receptacle at the lower end thereof and branch conduits at varying elevations thereon, leading to openings in floors or other devices of a building or other structure, bait-holding devices adjacent said openings in the floors, and tilting platforms working over the said openings and provided with counterpoise-weights whereby animals will be thrown into the branch conduits and from thence into the chute.

2. In a device of the character set forth, the combination of a building having floors with openings therein and recesses leading from said openings, bait-supporting devices on one side of the openings, tilting platforms or traps pivotally positioned over the openings and having arms carrying counterpoise-weights adapted to rest in the recesses, a vertically-disposed chute having a liquid-containing reservoir or receptacle at the lower end thereof, and branch pipes or conduits leading from the openings in the floor to the said chute.

3. In a device of the character set forth, the combination of a chute having a lower liquid-containing receptacle and branch conduits at varying elevations with the upper ends adjacent openings, and automatically opening and closing platforms over the said openings.

In testimony whereof I affix my signature in presence of two witnesses.

WILLIAM DU HENRI BROWN.

Witnesses:
   F. P. GALLAGHER,
   JOSEPH SINGLETON.